(12) United States Patent
Carro

(10) Patent No.: US 7,007,228 B1
(45) Date of Patent: Feb. 28, 2006

(54) ENCODING GEOGRAPHIC COORDINATES IN A FUZZY GEOGRAPHIC ADDRESS

(75) Inventor: Fernando Incertis Carro, Valencia (ES)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/523,811

(22) Filed: Mar. 13, 2000

(30) Foreign Application Priority Data

Jul. 29, 1999 (EP) .............................. 994800712

(51) Int. Cl.
*G06F 7/00* (2006.01)

(52) U.S. Cl. .................. 715/513; 715/501.1; 715/760; 707/3; 340/990; 340/995.1

(58) Field of Classification Search ............ 715/501.1, 715/513, 760; 345/760, 135; 701/200; 340/995.1, 340/11, 990; 707/3
See application file for complete search history.

(56) References Cited

U.S. PATENT DOCUMENTS

| | | | | |
|---|---|---|---|---|
| 5,774,828 | A * | 6/1998 | Brunts et al. ............... | 701/210 |
| 5,893,093 | A | 4/1999 | Wills | |
| 6,138,072 | A * | 10/2000 | Nagai ......................... | 701/207 |
| 6,148,260 | A * | 11/2000 | Musk et al. ................. | 701/200 |
| 6,202,022 | B1 * | 3/2001 | Ando ......................... | 701/200 |
| 6,202,023 | B1 * | 3/2001 | Hancock et al. ............ | 701/201 |
| 6,202,065 | B1 * | 3/2001 | Wills ............................ | 707/5 |
| 6,263,343 | B1 * | 7/2001 | Hirono ..................... | 707/104.1 |
| 6,266,676 | B1 * | 7/2001 | Yoshimura et al. ...... | 707/104.1 |
| 6,336,072 | B1 * | 1/2002 | Takayama et al. .......... | 701/200 |
| 6,466,940 | B1 * | 10/2002 | Mills .......................... | 707/102 |
| 6,487,305 | B1 * | 11/2002 | Kambe et al. .............. | 382/113 |
| 6,487,495 | B1 * | 11/2002 | Gale et al. .................. | 701/209 |
| 6,504,571 | B1 * | 1/2003 | Narayanaswami et al. ...................... | 348/231.99 |
| 6,584,328 | B1 * | 6/2003 | Kung .......................... | 455/566 |
| 6,650,647 | B1 * | 11/2003 | Ishikawa et al. ............ | 370/400 |
| 6,735,585 | B1 * | 5/2004 | Black et al. ................... | 707/3 |

FOREIGN PATENT DOCUMENTS

AU 5303198 8/1998

OTHER PUBLICATIONS

"Laura Lemay's Web Workshop Creating Commercial Web Pages", Lemay et al, Sams, 1996, pp. 73-75.*
Gardels, K., "Open GIS and On-Line Environment Libraries", ACM Sigmod Record, Mar. 1997, vol. 26, Issue 1.*

(Continued)

*Primary Examiner*—Cesar B Paula
(74) *Attorney, Agent, or Firm*—Yee & Associates, P.C.; Jerry W. Herndon (57) ABSTRACT

A system and method for searching, accessing, retrieving, representing and browsing geographic or location related information from the Web (i.e.: HTML documents that describe physical places), including a geographic distribution of places where selectable types of resources are located or certain types of services provided. A user may select any one of the automatically mapped locations and browse the information for this location.

Documents accessible through the Web are tagged with the cartographic coordinates of the physical location referenced in the document and, optionally, with attributes of this physical location. Also provided is a method for searching and retrieving the tagged documents from a computer system by queries specifying parameters such as the cartographic coordinates of a reference location, the size of the geographic area to search around this reference location, and/or attributes of the locations to search inside that geographic area.

20 Claims, 7 Drawing Sheets

OTHER PUBLICATIONS

Imielinsky et al, "GPS-Based Geographic Addressing, Routing, and Resource Discovery", Comm. of the ACM, Apr. 1999, vol. 42, No. 4.*

Computer Networks & ISDN Systems, "Maps Alive: Viewing Geospatial Information on the WWW" by M. Potmesil, North Holland Publishing, Amsterdam, Sep. 1997, vol. 29, No. 8-13, pp. 1327-1342.

Research and Advanced Technology for Digital Libraries, First European Conference, ECDL '97 Proceedings, Pisa, Italy, Sep. 1-3, 1997.

Tochtermann et al, Using Semantic, Geographical, and Temporal Relationships to Enhance Search and Retrieval in Digital Catalogs, p. 73-86.

* cited by examiner

Absolute Geographic Coordinates (AGCs):

A) <u>For a Point Situated at ($\alpha$ "W, $\beta$"N):</u>
   $X = \alpha \times (2.500/81) \times \cos(\beta \times 90/324.000)$ m
   $Y = 10.000.000 - \beta \times (2.500/81)$ m

B) <u>For a Point Situated at ($\alpha$ "E, $\beta$"N):</u>
   $X = 1.296.000 - \alpha) \times (2.500/81) \times \cos(\beta \times 90/324.000)$ m
   $Y = 10.000.000 - \beta \times (2.500/81)$ m C) <u>For a Point Situated at ($\alpha$ "W, $\beta$"S):</u>
   $X = \alpha \times (2.500/81) \times \cos(\beta \times 90/324.000)$ m
   $Y = 10.000.000 - \beta \times (2.500/81)$ m D) <u>For a Point Situated at ($\alpha$ "E, $\beta$"S):</u>
   $X = 1.296.000 - \alpha) \times (2.500/81) \times \cos(\beta \times 90/324.000)$ m
   $Y = 10.000.000 - \beta \times (2.500/81)$ m

FIG.1

Fuzzy AGCs Determine Geodesic Squares

Given a Point of the Earth with AGCs:

$X = x_7x_6x_5x_4x_3x_2x_1x_0$
$Y = y_7y_6y_5y_4y_3y_2y_1y_0$

Then, the "FUZZY" AGCs:

$X^* = x_7x_6x_5x_4x_3{}^*$
$Y^* = y_7y_6y_5y_4y_3{}^*$

Specify the Geodesic Square that contains all AGC1 (X,Y), such that:

$x_7x_6x_5x_4x_3 000 \leq X \leq x_7x_6x_5x_4x_3 999;\ \Delta X = 1000m$
$y_7y_6y_5y_4y_3 000 \leq Y \leq y_7y_6y_5y_4y_3 999;\ \Delta Y = 1000m$

FIG. 2

Conventional Digital Map

ENCODING GEOGRAPHIC COORDINATES IN A FUZZY GEOGRAPHIC ADDRESS

FIELD OF THE INVENTION

The present invention relates to Internet and network computing technologies and more particularly to a system and method for automatically searching, retrieving and mapping from the World Wide Web (www) a geographic distribution of places where specific types of resources are located or certain types of services provided (hospitals, bus terminals, historical places, oil-posts, restaurants, hotels, etc.).

BACKGROUND ART

Internet

Internet is a global network of computers and computers networks (the "Net"). The Internet connects computers that use a variety of different operating systems or languages, including UNIX, DOS, Windows, Macintosh, and others. To facilitate and allow the communication among these various systems and languages, the Internet uses a language referred to as TCP/IP ("Transmission Control Protocol/Internet Protocol"). TCP/IP protocol supports three basic applications on the Internet:

- transmitting and receiving electronic mail (e-mail),
- logging into remote computers (the "Telnet"), and
- transferring files and programs from one computer to another ("FTP" or "File Transfer Protocol").

World Wide Web

With the increasing size and complexity of the Internet, tools have been developed to help find information on the network, often called navigators or navigation systems. Navigation systems that have been developed include standards such as Archie, Gopher and WAIS. The World Wide Web ("WWW" or "the Web") is a recent superior navigation system. The Web is:

- an Internet-based navigation system,
- an information distribution and management system for the Internet, and
- a dynamic format for communicating on the Web.

The Web seamlessly, for the user, integrates different formats of information, including still images, text, audio and video. A user on the Web using a graphical user interface ("GUI", pronounced "gooey") may transparently communicate with different host computers on the system, access different system applications (including FTP and Telnet), and select different information formats for files and documents including, for example, text, sound and graphics.

Hypermedia

The Web uses hypertext and hypermedia. Hypertext is a subset of hypermedia and refers to computer-based "documents" in which readers move from one place to another in a document, or to another document, in a non-linear manner. To do this, the Web uses a client-server architecture. The Web servers enable the user to access hypertext and hypermedia information through the Web and the user's computer. (The user's computer is referred to as a client computer of the Web server computers.) The clients send requests to the Web servers, which react, search and respond. The Web allows client application software to request and receive hypermedia documents (including formatted text, audio, video and graphics) with hypertext link capabilities to other hypermedia documents, from a Web file server. The Web, then, can be viewed as a collection of document files residing on Web host computers that are interconnected by hyperlinks using networking protocols, forming a virtual "web" that spans the Internet.

Uniform R Source Locators

A resource of the Internet is unambiguously identified by a Uniform Resource Locator (URL), which is a pointer to a particular resource at a particular location. A URL specifies the protocol used to access a server (e.g. HTTP, FTP, . . . ), the name of the server, and the location of a file on that server.

Hyper Text Transfer Protocol

Each Web page that appears on clients of the Web may appear as a complex document that integrates, for example, text, images, sounds and animation. Each such page may also contain hyperlinks to other Web documents so that a user at a client computer using a mouse may click on icons and may activate hyperlink jumps to a new page (which is a graphical representation of another document file) on the same or a different Web server.

A Web server is a software program on a Web host computer that answers requests from Web clients, typically over the Internet. All Web servers use a language or protocol to communicate with Web clients which is called Hyper Text Transfer Protocol ("HTTP"). All types of data can be exchanged among Web servers and clients using this protocol, including Hyper Text Mark-up Language ("HTML"), graphics, sound and video. HTML describes the layout, contents and hyperlinks of the documents and pages. Web clients when browsing:

- convert user specified commands into HTTP GET requests,
- connect to the appropriate Web server to get information, and
- wait for a response. The response from the server can be the requested document or an error message.

After the document or an error message is returned, the connection between the Web client and the Web server is closed.

The first version of HTTP is stateless, meaning that there is no continuous connection between each client and each server in the initial protocol. The Web client using HTTP receives a response as HTML data or other data. This description applies to version 1.0 of HTTP protocol, while the new version breaks this barrier of stateless protocol by keeping the connection between the server and client alive under certain conditions.

Browser

After receipt, the Web client formats and presents the data or activates an ancillary application such as a sound player to present the data. To do this, the server or the client determines the various types of data received. The Web Client is also referred to as the Web Browser, since it in fact browses documents retrieved from the Web Server.

Search for Information

Today, the search of information in the World Wide Web (also called the "Web") is mostly based on alphabetic queries, comprising one or several search terms or keywords, and on services of Web search tools (i.e.: Lycos, Yahoo, Altavista, Netscape, Web Crawler, etc.). Alphabetic queries normally retrieve very large lists composed of hundreds or even thousands of URLs (Uniform Resource Locators) that match the query terms. Because more and more information is placed on the Web, users are faced with the growing problem of searching, identifying and selecting a rich, updated and useful information among an enormous amount of information, most of the time irrelevant for the intended purposes. This phenomena is very well summarized in the following comment:

"We have all heard of the perils of information overload. In contrast with "Internet addiction," information overload wreaks more subtle effects, creating a sense of pervasive angst or apathy in this frenetic Cyber Age. As more and more information becomes available in ever more intricate forms on the Net, the problem promises only to become worse, particularly as it is so difficult to distinguish good, reliable information from the false or outdated variety."—Marguerite Holloway—"Labeling the Web", by Marguerite Holloway, IBM Research Magazine, Vol. 35, No. 3, 1997.

Therefore, there is a real and urgent need to improve the methods for searching and selecting information from the Web. Many researchers are adapting the technology to make Web searches much more selective and effective than they are now. A widely accepted approach today consists of attaching labels and meta data to documents on the Web. It is an attempt to make possible the separation of the cyber-wheat from the chaff.

Geographic Information Systems

A lot of people have a real need to be immediately and easily informed about their environment. People need to have more and more information concerning particular places or type of places, buildings or service points located on rural or urban areas.

Today, there is a common requirement to develop better systems to enable people to identify and locate resources or services without any need of doing complex alphabetic queries that normally require preliminary knowledge about the subject that is searched (names of locations, addresses, relative distances, idioms, geographic positions, etc.). This need has been identified a long time ago by Geographic Information Systems (GIS) providers, cartographic information providers and most of the Web information providers (e.g.: Netscape Local Channel on http://www.netscape.com/local/index.html). Those institutions and many other (e.g.: travel agencies, government agencies, local authorities, etc.) today provide geographic and cartographic information in the Web by means of several services that enable the user to access, browse or download many different types of digitized maps for practically all regions of the world.

WebGIS

A much recent attention has been focused on the development of GIS functions on the Internet, Worldwide Web, and private Intranets. The WebGIS (abbreviation used to call the GIS applications on the Web) has the potential to make distributed geographic information (DGI) available to a very large worldwide audience. Internet users can access GIS applications from their Browsers without purchasing proprietary GIS software. Today the WebGIS makes it possible to add GIS functionality to a wide range of network-based applications in business, government, and education. Many of these applications run on Intranets within business companies and government agencies as a means of distributing and using geospatial data.

Many experiments are now underway in WebGIS and related map server applications for interactive cartography. One of the important areas of innovation involves "pay-for-use" mapping and GIS services. The challenge of WebGIS is to create software systems that are platform independent and able run on open TCP/IP networks (Transmission Control Protocol/Internet Protocol networks), that means on any computer capable of connecting to the Internet (or any TCP/IP network) and running a Web Browser. Many strategies are employed to add GIS functions to the Web:

Server-side strategies allow users (Web clients) to submit requests for data and analysis to a Web server. The Web server processes the requests and returns data or a solution to the remote Web client.

Client-side strategies allow users to perform some data manipulation and analysis locally on their own workstation.

Server and client processes can be combined in hybrid strategies for optimizing performance and for meeting special user needs.

Common drawbacks are shared by almost all current GIS services present on the Web. The cartographic or geographic information provided by modern WebGIS or WebMAPPING systems:

is proprietary. The information is centrally owned, administered, actualized and distributed by some individual authority or information provider.

is static. It is not possible, directly from the maps, to link and get access to the information associated to the different locations represented on the maps.

is specialized and limited to certain types of data selected by the information provider (e.g. Fodor's restaurant index on http://www.fodors.com/ri.cgi, Fodor's hotel index on http://www.fodors.com/hi.cgi).

Note: The expression "static information" means that maps provided on the Web are simple scanned images (named also "rasted" images, like a simple GIF or TIF file). The information cannot be panned, zoomed or translated. The information is simply limited to "what you see".

By contrast, the expression "dynamic information" can be used with GIS systems using "vector" maps, where additional information can be extracted by means of advanced functions such as area, distance, gravity center . . . , where links to other maps can be created . . .

The following comments can be applied to most WebGIS services:

"Even good map[s] . . . are but approximations of what is out there."—Barry Lopez—"Arctic dreams", by Barry Holstun Lopez, 1945; Scribner, N. Y., 1986, ISBN: 0684185784

"Ultimately maps . . . gain their power and usefulness from making connections and enabling unanticipated connections."—David Turnbull—"Maps are Territories, Science is an Atlas", by David Turnbull, University of Chicago Press, Chicago, 1993

"All maps begin to lose their accuracy as soon as they are printed."—Gregory C. Staple—"Notes on Mapping the Net: From Tribal Space to Corporate Space", by Gregory C. Staple, TeleGeography Inc, 1995

Specialized, Static and Proprietary Maps

Proprietary, static and specialized maps in general provide a limited amount of information and in many instances they lack the information that the user is interested in knowing. The design, content richness, maintenance, scale or resolution are limited most of the time for cost reasons. Frequently, proprietary maps are outdated, and they do not contain the required, updated and useful information. Out of very limited geometric operations (translate, rotate, pan, zoom), most of them lack powerful advanced tools to modify the information (the views) shown or to increase the information content (the view) of the map to reflect the geographic distribution of all possible kinds of selectable types of locations, establishments or service points (e.g.: locations of restaurants, pharmacies, parking, police stations, hospitals, historic monuments, bakeries, pubs, etc.).

Alphabetic Queries

On the other side, today, most methods of searching geographic information on the Web require from the user, as a preliminary step, the launch of one or a plurality of alphabetic queries (standard search tools are available on the Web) to retrieve the list of URLs that match the query. An alphabetic query requires:

1. to know in advance the URL or the name, address or any other specific reference concerning the location, or alternatively
2. to make a generic search by means of some generic geographic terms or generic search names (like city name, street name, county name, business name). The problem is then to identify the location sometimes from a very large list of documents.

Once a location is selected, some services on the Web (e.g.: Netscape Local Channel) enable to view over a digital map of the area, the position of the location.

From the above cited considerations, today there is a real need of a new system that could allow people to identify, locate and become fully informed about all kinds of resources or services without:

having a preliminary knowledge of the geography and locations names to select, classify or discard (e.g. without knowing in advance city street names or distances to access a particular service or location).

doing complex queries (that normally require to have a preliminary knowledge about the subject to ask for), being dependent on the quantity or the quality of the information provided by servers.

New Generation of Geographic Information System

More specifically, there is a need for a new GIS system for automatically searching, retrieving and mapping "from all the information available on the Web" the geographic distribution of places, located inside regions of different sizes around any chosen reference point of the world, where selectable types of resources are located or certain types of services are provided (hospitals, bus terminals, historical places, oil-posts, restaurants, hotels, etc.). As an additional desirable feature of a system like this, the user must be able to select any one of the automatically mapped locations and to browse the information retrieved from the Web for this point, without any resort to services of specialized geographic information systems or mapping systems providers.

Simplicity of use of the new system must be such that all that is requested from the user's side is limited to a simple questions like: "What I am looking for?" (i.e.: hospitals, bus terminals, water springs, restaurants, etc.). In some other cases the user must be able to restrict the search to a geographic region. The user must be able to point over a digital map or to specify coordinates (longitude/latitude) of a central reference point of the world, even distant from his actual position to execute the search in a region around this point.

The new generation of WebGIS must provide always updated and really dynamic maps showing the locations of all types of topics around the world. Also, maps must automatically resolve all kinds of questions by mapping the spatial distribution of locations with specific resources. These maps must make possible the access to all the available information concerning these locations from everywhere in the world. Finally, maps must always be accurate. For that they must be updated every day by the thousands of information providers on the Web throughout the world.

OBJECTS OF THE INVENTION

It is an object of the present invention to improve the current methods and systems for searching and retrieving geographic or location related information on the Web.

It is another object to avoid irrelevant or outdated information when searching geographic or location related information on the Web.

It is a further object of the present invention to access, retrieve and browse directly over maps information placed on Web servers (e.g.: HTML documents) and related to physical locations.

It is a further object of the present invention to access, retrieve and browse information according to a geographic distribution (instead of an alphabetic order) giving thus to all Web servers with location related information an improved opportunity and an equal chance to share information.

It is a further object of the present invention to provide Internet users with automatically created and updated maps showing the geographic distribution of any place with any type of resources that could be referenced throughout the Web.

It is a further object of the present invention to allows Internet users to browse information, select, locate, navigate and reach places in the world without accessing specific geographic information providers or geographic information systems.

It is a further object of the present invention to create dynamic maps not from one of a few of sources but from the information of the millions of sources, in particular from the URLs on the Web.

It is another object of the present invention to allow Internet users to map locations selected according to a particular location type, simply by specifying a single reference point of the world (this point being their actual position or any other remote virtual position), and by specifying the size of the geographic area around this reference point.

It is still another object of the present invention to selectively, interactively and automatically overlay conventional digital maps with an updated distribution of locations of the type the user is searching, thus avoiding an overload of conventional maps with excess of irrelevant or outdated information.

SUMMARY OF THE INVENTION

The present invention related to a system and method in a server system for processing documents comprising information related to geographic locations in a network comprising one or a plurality of server systems. The method comprises for each document the steps of:

determining geographic coordinates of the geographic location described or referenced in the document;

encoding the geographic coordinates in a geographic address (gURL);

tagging the document with said geographic address (gURL).

The method comprises also the further step of:

tagging the document with one or a plurality of geographic attributes related to the geographic location described or referenced in the document.

The present invention also relates to a document that can be accessed on a server system from a client system in a network, comprising information related to a geographic location. The document is characterized in that it comprises:
  a tag including a geographic address (gURL), the geographic address comprising encoded geographic coordinates of the geographic location described or referenced in the document.

In particular, the tag includes:
  one or a plurality of attributes related to the geographic location described or referenced in the document.

The present invention also relates to a system and method in a client system for searching claimed documents. The method comprises the steps of:
  specifying a reference point;
  determining geographic coordinates of the reference point;
  encoding the geographic coordinates in a geographic address (gURL);
  searching on the one or plurality of server systems for documents tagged with the geographic address (gURL).

The method comprises the further steps of:
  specifying one or a plurality of geographic attributes;
  searching on the one or plurality of server systems, for documents tagged with the one or plurality of geographic attributes.

The method comprises the further steps of:
  specifying a geographic area around the reference point;
  determining geographic coordinates of the geographic area;
  encoding the geographic coordinates in a fuzzy geographic address;
  searching on the one or plurality of server systems, for documents tagged with a geographic address corresponding to a geographic location within the geographic area.

The present invention also relates to a system and method in a client system for displaying geographic information comprised in claimed documents. Said method comprises for each document the steps of:
  retrieving the absolute geographic coordinates from the geographic address tagged on the documents;
  mapping the geographic location according to the absolute geographic coordinates.

BRIEF DESCRIPTION OF THE DRAWINGS

The novel and inventive features believed characteristics of the invention are set forth in the appended claims. The invention itself, however, as well as a preferred mode of use, further objects and advantages thereof, will best be understood by reference to the following detailed description of an illustrative detailed embodiment when read in conjunction with the accompanying drawings, wherein.

PREFERRED EMBODIMENT OF THE INVENTION

Introduction

The present invention relates to a system and method for accessing, retrieving, representing and browsing geographic or location related information from the Web (i.e.: HTML documents that describe physical places). More particularly, the present invention relates to a system and method for automatically searching, retrieving, representing and browsing from the Web a geographic distribution of places where selectable types of resources are located or certain types of services provided (hospitals, bus terminals, historical places, oil-posts, restaurants, hotels, etc. . . .). These places are located inside regions of different sizes around any reference point of the world. The invention enables a user to select any one of the automatically mapped locations and to browse the information retrieved from the World Wide Web for this location, without any resort to services of specialized geographic information systems or geographic information providers.

Document Tagging

The system according to the present invention comprises means for tagging each document accessible through the Web with the cartographic coordinates (longitude, latitude and optionally altitude) of the physical location referenced in the document and, optionally, with one or a plurality of attributes of this physical location. The invention also comprises a method for searching and retrieving from the Web the tagged documents from a computer system by means of queries specifying:
  the cartographic coordinates (longitude and latitude) of a reference location anywhere in the world, and the size of the geographic area to search around this reference location, and/or
  one or several attributes of the locations to search (location type key words) inside that geographic area.

Geographic Fuzzy Query

According to the present invention, a query before its sending to the Web, is first transformed into a "geographic fuzzy query". Depending on the size of the geographic area to cover, one or several of the less significative digits of the reference coordinates are replaced by a single wild card character, like "*". The geographic fuzzy query thus specifies at the same time all possible cartographic coordinates (longitude and latitude) of locations that have in common a set of most significative digits. The geographic fuzzy query is therefore interpreted by all Web search tools or database search tools as an instruction to search and retrieve from the Web all documents tagged comprising cartographic coordinates of points located inside a geographic area (geodesic parallelogram) of the specified size around a reference point. The reference coordinates specified on the query correspond to the reference point within this geographic area.

Relative Coordinates

The collection of hyperlinks (i.e.: URLs) retrieved from the Web by means of the above class of geographic fuzzy queries is stored on the computer system along with the coordinates tagged on each one of the corresponding HTML documents, thus creating a table of hyperlinks/coordinates for all retrieved documents. For each entry in this table, the relative coordinates of each retrieved document are computed with respect to the coordinates of the reference point specified in the query. Those relative geographic coordinates (i.e. relative longitude and relative latitude) are scaled to the size of the display of the computer system and the hyperlink map representing the geographic distribution of locations referenced on all retrieved documents is displayed. Additionally, by using the same scales and coordinates system, the position of the reference point specified in the query is displayed on the hyperlink map.

Hyperlink Cartography

By means of software tools that are well known by most skilled persons in the computer programming art, a retrieved document displayed on the hyperlink map can be represented by an icon (selected from an icon library or defined in any one of many possible forms). The hyperlink corresponding to the HTML document can be associated to this icon position in such a form that, when pointing or clicking by means of some pointer device over the icon's position, the associated HTML document is selected and retrieved from the Web and displayed and browsed by the user.

Hyperlink maps according to the present invention consist in constellations of icons scattered over an area of the user's display. Each icon points to the physical address (cartographic coordinates) of a location of a specific class or type that belong to a specific region in the world. At the same time, each icon points to the logical address (hyperlink URL) of an HTML document where the information concerning this location can be found.

Cartographic Coordinates

Cartographic coordinates for the reference point can be those corresponding with the actual user's location. These coordinates can be known in advance or, alternatively, be determined by some of different types of today available automatic positioning and navigation means or can be derived by pointing to a conventional digitized map. Cartographic coordinates for remote locations can be specified manually by the end user or, alternatively, can be automatically derived by map.

As it will be described hereunder, the present invention is shared between Web Servers and Web Clients.

Web Servers

On the side of the Web Servers:

Geographic Uniform Resource Locator

It is one object of the present invention to create geographic maps from the information contained in the Web by associating with the concept of "logical address", URL (Uniform Resource Locator), the concept of "physical address" or "geographic address" named "gURL" (geographic Uniform Resource Locator). Web documents (i.e.: HTLM documents) describing information related with physical locations (geographic positions) are tagged by means of these "geographic Uniform Resource Locators" (gURLs). "Absolute Geographic Coordinates" (AGCs) of physical locations are encoded (latitude, longitude and optionally altitude) in these "gURLs", optionally with a plurality of "geographic descriptors" identifying the geographic attributes (region name, county name, city name, street name, etc . . . ), the type of resources (restaurant, water spring, lake, hospital, etc.) or other relevant attributes of the physical locations.

Any HTML document in the Web, from any source, that references or contains information related to a physical location, can be tagged on the Web server by the information provider with the corresponding "gURL". HTML documents in this form allow queries on the Web of the type "geographic fuzzy queries". Users can map the coordinates of a location and link and browse the associated HTML document describing said location.

Authors of "iconic maps" are not exclusively the cartographic institutions, GIS providers, government agencies or other particular provider, but everybody that puts "location related" information on the Web (e.g.: the owners of hotels, restaurants, car parking, oil posts, etc., . . . ).

Absolute Geographic Coordinates

Figure 1:
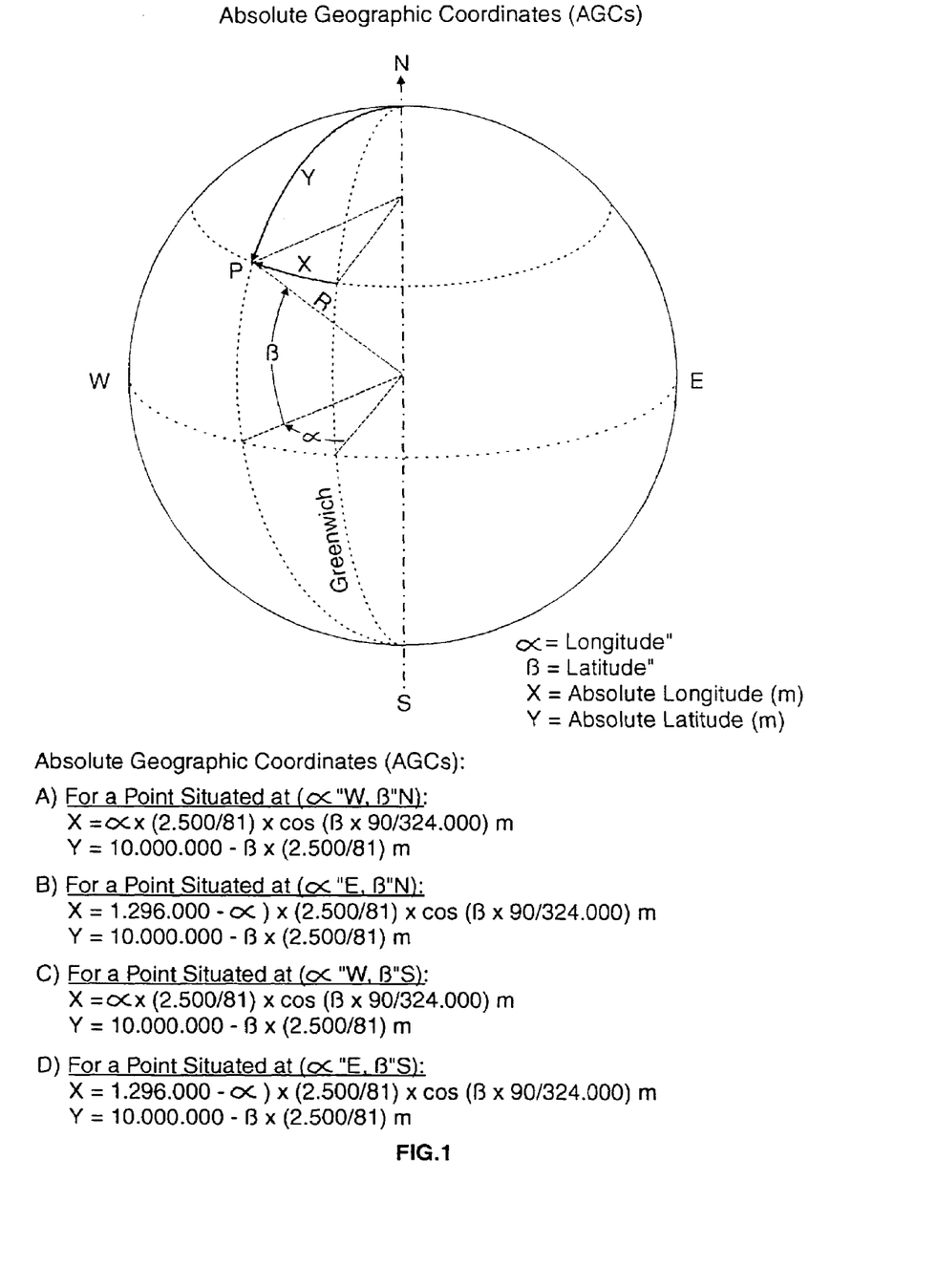
FIG. 1 describes the concept of Absolute Geographic Coordinates (AGCs) and gives the mathematical formulas to compute the AGCs from the geographic coordinates (latitude and longitude in seconds of arc).

FIG. 1 describes the concept of an Absolute Geographic Coordinates (AGCs) and gives the mathematical formulas to compute the AGCs from the coordinates (latitude and longitude in seconds of arc) of any location of the world. The "Absolute Geographic Coordinates" (AGCs) of a given point in the earth, measures:

1. The absolute longitude X, as the length in meters of the arc of the terrestrial parallel that goes from the Greenwich meridian to that point in clockwise direction.
2. The absolute latitude Y, as the length in meters of the arc of terrestrial meridian from North Pole to that point.

Therefore, coordinates convention of AGCs is such that absolute longitude X and absolute latitude Y, are both integer positive numbers (natural numbers).

A/ For a point situated at (Longitude" W, Latitude" N):

$X = \text{Longitude"} \times (2.500/81) \times \cos(\text{Latitude"} \times 90/324.000)$ m $Y = 10.000.000 - \text{Latitude"} \times (2.500/81)$ m B/ For a point situated at (Longitude" E, Latitude" N):

$X = (1.296.000 - \text{Longitude"}) \times (2.500/81) \times \cos(\text{Latitude"} \times 90/324.000)$ m $Y = 10.000.000 - \text{Latitude"} \times (2.500/81)$ m C/ For a point situated at (Longitude" W, Latitude" S):

$X = \text{Longitude"} \times (2.500/81) \times \cos(\text{Latitude"} \times 90/324.000)$ m $Y = 10.000.000 + \text{Latitude"} \times (2.500/81)$ m D/ For a point situated at (Longitude" E, Latitude" S):

$X = (1.296.000 - \text{Longitude"}) \times (2.500/81) \times \cos(\text{Latitude"} \times 90/324.000)$ m $Y = 10.000.000 + \text{Latitude"} \times (2.500/81)$ m By example, the AGCs for a point with geographic coordinates:

Latitude: 42° 35' 37" N=42×3.600+35×60+37=153.337"

Longitude: 3° 70' 59" W=3×3.600+70×60+59=15.059"

are computed by the formulas:

$$Y = 10.000.000 - \text{Latitude"} \times (2.500/81) = 05267376 \text{ m}$$

$$X = \text{Longitude"} \times (2.500/81) \times \cos(\text{Latitude"} \times 90/324.000) = 00342161 \text{ m}$$

By definition, for any point of the world with AGCs:

$$X = xxxxxxxx$$

$$Y = yyyyyyyy$$

the associated gURL will be:
  GURLXxxxxxxxx GURLYyyyyyyyy where prefixes GURLX and GURLY are—by some agreed universal convention—tags used to mark the AGCs (X, Y) for any HTML document that references any location of the world.

In the above example, the gURL from the computed AGCs is (by convention) equal to:
  GURLX00342161 GURLY05267376

Burgos Cathedral

An example of HTML document tagged with gURLs according to the present invention is given hereunder.

A monument in the Spanish city of Burgos is the "Cathedral". The geographic coordinates (Latitude, Longitude) of a reference point on this monument are:
  Latitude: 42° 35' 37" N
  Longitude: 3° 70' 59" W The computed associated AGCs are:

$$Y = 05267376 \text{ m}$$

$$X = 00342161 \text{ m}$$

The "Burgos Cathedral" is described in a HTML document placed in a Web server with the following URL:
  http://www.tulane.edu/lester/text/Gothic/Late.Gothic/Late.Gothic43.html The information provider can tag the HTML document with the gURL of the "Burgos Cathedral" computed from the cartographic coordinates of the "Burgos Cathedral":
  GURLX00342161 GURLY05267376

He can also tag the HTML document with the following conventional geographic descriptors:

Monument and Burgos

The resulting HTML document, tagged by means of the disclosed invention, is as follows:

HTML Source File:
  <TITLE>FACADE</TITLE>
  <A HREF="/lester/images/Gothic/Late.Gothic/I85.jpg"><IMG SRC="/lester/images/Gothic/Late.Gothic/I85.gif"></A>
  <H1>BURGOS CATHEDRAL</H1>
  <pre>
  <I>
  GURLX00342161 GURLY05267376 MONUMENT BURGOS
  Burgos Cathedral
  Begun second half of the 13th century
  (doors replaced in the 18th century),
  towers and spires finished 1442
  (by John of Cologne)
  </I>
  </pre>

Burgos Cathedral is much closer to the northern Gothic style. The lowest story of the facade is severe and planar. The upper stories are linear and vertical in style. Elegant tracery forms throughout give lightness to the design, most notably in the tall openwork spires.
  <p>
  <A HREF="/lester/text/Gothic/Late.Gothic/Late.Gothic.html"><IMG SRC="/icons/TUBackBtn.gif"></A>

All providers of information related with geographic locations can tag the HTML documents they place in the Web with gURLs and geographic descriptors.

Web Clients

On the Web Client side, the method according to the present invention comprises the steps of:
  computing fuzzy geographic coordinates from the geographic coordinates of a selected reference point and from a specified search area;
  sending a geographic fuzzy query;
  retrieving Absolute Geographic Coordinates (AGCs) from found documents;
  displaying the locations corresponding to the retrieved Absolute Geographic Coordinates;
  accessing the documents associated with displayed locations.

Fuzzy Geographic Coordinates

From the geographic coordinates of a selected reference point in the world (i.e.: the user's actual position or any other reference position in the world determined by any means), the Web client:
  a. Computes the AGCs (Xr: xxxxxxxx, Yr: yyyyyyyy) of this reference point.
  b. Specifies one or more geographic descriptors (DESC1, DESC2, . . . , DESCn) to perform the search.
  c. Specifies the area to be covered by the search (e.g.: 10×10 m, 100×100 m, 1×1 Km, 10×10 Km, 100×100 Km, . . . , or all the world).

Then a query string of the following form is executed:
  +GURLXxxxxxxx*+GURLYyyyyyyy*+DESC1+DESC2+DESC3 . . . +DESCn
  to perform a search in an area of 10×10 m
  +GURLXxxxxxx*+GURLYyyyyyy*+DESC1+DESC2+DESC3 . . . +DESCn
  to perform a search in an area of 100×100 m
  +GURLXxxxxx*+GURLYyyyyy*+DESC1+DESC2+DESC3 . . . +DESCn
  to perform a search in an area of 1×1 Km,
  +GURLXxxxx*+GURLYyyyy*+DESC1+DESC2+DESC3 . . . +DESCn
  to perform a search in an area of 10×10 Km,
  +GURLXxxx*+GURLYyyy*+DESC1+DESC2+DESC3 . . . +DESCn
  to perform a search in an area of 100×100 Km
  +GURLXxx*+GURLYyy*+DESC1+DESC2+DESC3 . . . +DESCn
  to perform a search in an area of 1.000×1.000 Km,
  +GURLXX*+GURLYY*+DESC1+DESC2+DESC3 . . . +DESCn
  to perform a search in an area of 10.000×10.000 Km, and, finally
  +GURLX*+GURLY*+DESC1+DESC2+DESC3 . . . +DESCn
  to perform a search "EVERYWHERE IN THE WORLD"

Figure 2:
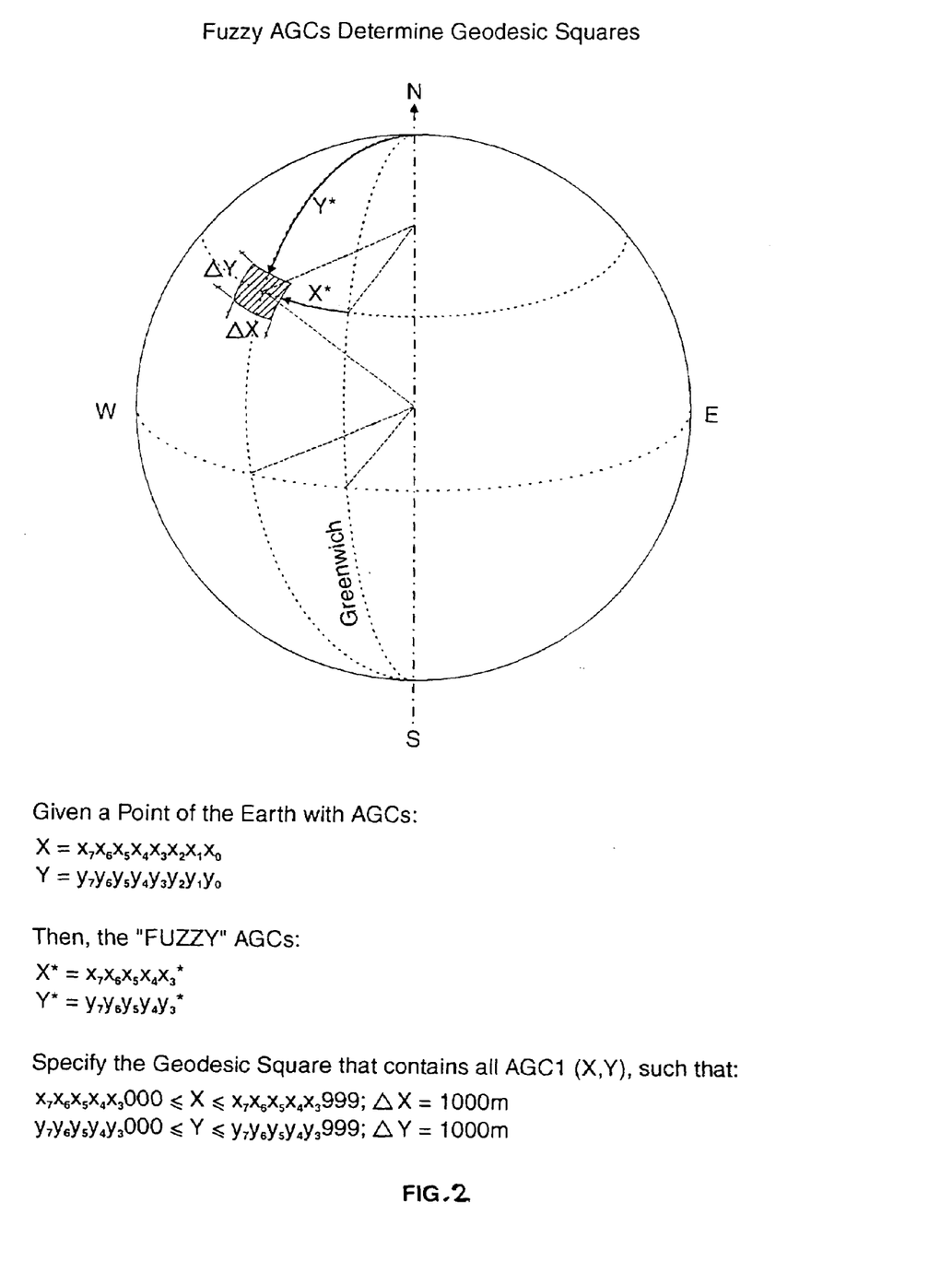
FIG. 2 describes the concept of "fuzzy geographic coordinates" (X*, Y*) and more particularly shows how said "fuzzy geographic coordinates" (X*, Y*) determine an area of land (geodesic parallelogram or square) around a reference point.

A "geographic fuzzy query" is computed from the AGCs of the reference point (natural numbers Xr, Yr) specified in the query. Depending on the size of the area to cover, the less significative digits of the pair (Xr, Yr) associated with this reference point are replaced by a single wild card ("*") character. The concept of geographic "fuzzy query" is based on the concept of "fuzzy geographic coordinates", illustrated in FIG. 2. The "Fuzzy geographic coordinates" (X*, Y*) are obtained from the AGCs (X, Y) of a geographic point. They determine an area of land (geodesic parallelogram) around this point.

As a consequence of the concept of "fuzzy geographic coordinates", a special class of geographic DUMMY queries +GURLX*+GURLY* is defined in the present invention to search and map all the locations in the world responding to the geographic descriptors (DESC1, DESC2, DESC3, ..., DESCn). A DUMMY query of the form:

+GURLX*+GURLY*+DESC1+DESC2+DESC3 ... +DESCn does not require the specification in advance of a reference point to locate, map and retrieve the information of "all places of the world" that have in common the same geographic descriptors.

Geographic Fuzzy Query

By means of any Internet search tool (e.g.: Lycos, Yahoo, Altavista, etc.) or other functionally equivalent available on Intranets, a "geographic fuzzy query" is sent to retrieve all referenced HTML documents, placed on the Web by any public or private information provider. Retrieved HTML documents:

a) have been tagged with one or several gURLs and include AGCs corresponding to points "located inside" the area covered by the "fuzzy AGCs" of the query. That means, for example, that an HTML document that contains the AGCs:

GURLXxxxxx??? GURLYyyyyy??? (where "?" is any number)

will match a "geographic fuzzy query" of the form:

+GURLXxxxxx*+GURLYyyyyy* b) have been tagged with the geographic descriptors specified in the query:

DESC1 DESC2 DESC3 . . . . DESCn

For example, a query of the type:

+GURLXxxxxx*+GURLYyyyyy*+DESC1+DESC2 will retrieve all HTML documents containing geographic descriptors DESC1 and DESC2 and located inside the (1 km×1 Km) geodesic square:

xxxxx000<=X<=xxxxx999; yyyyy000<=Y<=yyyyy999 (meters)

The retrieved HTML documents will contain strings of the type:

GURLXxxxxx??? GURLYyyyyy??? DESC1 DESC2 (where"?" is any number)

As another example, a DUMMY query of the type:

+GURLX*+GURLY*+DESC1+DESC2 will retrieve all HTML documents containing the geographic descriptors DESC1 and DESC2 in any point of the world. HTML documents will contain strings of the type:

GURLX???????? GURLY???????? DESC1 DESC2

Therefore, the Web search tool will retrieve the list of all URLs that point to HTML documents that match the query:

a. HTML documents that contain gURLs of points located inside the geographic area covered by the query, and b. HTML documents that contain the same geographic descriptors than these included in the query.

Absolute Geographic Coordinates (AGCs)

In the HTML documents retrieved from the Web by the search tool according to the above "fuzzy query", text strings containing prefix tags GURLX and GURLY are searched. From these text strings the AGCs of each document (X=xxxxxxxx; Y=yyyyyyyy) are extracted and stored as numerical values. URLs and associated AGCs are stored in a table [URLi; Xi; Yi], with as many entries as URLs retrieved from the query.

Scale

From the URLs and associated AGCs stored in the table [URLi; Xi; Yi] and more particularly from the maximum and minimum values of the Xi and Yi coordinates, the graphical information is scaled in a way to obtain an optimal representation with the best possible resolution.

Iconic Representation

By means of this scale, for each entry in the table [URLi; Xi; Yi] a sensible icon (possibly associated with the one or plurality of geographic attributes used) is represented on the user's screen. The i-th icon:

a. Points to a geographic position (AGCs coordinates [Xi, Yi] of this point in the world).

b. Points to an URL ("network address" or "logic address"): URLi. This is the URL from where the information associated to the AGCs coordinates (and the gURL) can be retrieved.

If specified, by using the same scale, the point corresponding to the reference point [Xr, Yr] can be displayed on the user's screen.

A gURL map (hyperlink map) is therefore plotted on the user's screen. This gURL map represents the geographic distribution inside the search area (around the reference point [Xr, Yr] if specified) of locations [Xi, Yi] described in HTML documents. The map is displayed with appropriate scales information, distances between each location [Xi, Yi] and the reference point [Xr, Yr] (if specified), directions marks, etc. . . to make easy the visualization, positioning and orientation tasks.

The geographic coordinates retrieved by one or a plurality of queries can be processed by different algorithms for different purposes (i.e.: to measure distances between locations, to determine the gravity center of locations distribution, to draw a polygonal envelope of locations distribution, to measure the density of locations or number of locations by unit area, to cluster sets of locations, to determine the optimal route to travel through locations, etc.).

The distribution of the icons is displayed on a digital map with the same scale and reference point that are used to map and plot said sensible icons. The geographic map is retrieved from one or a plurality of server systems, or stored on the client system once for all.

The present application shows that it is possible to get an "alive hyper-links map" (over a background of a raster map or "static" map) by plotting over it a constellation of specific-topic icons. This constellation is equivalent on the web to a vector map in a GIS system because it contains "dynamic information". A plurality of different constellations for a plurality of topics can be interactively retrieved on the same map (e.g.: all restaurants, cafeterias and monuments in that area). The most important thing is that the information is retrieved at the same time from all the web sites (not from any specific information provider, like Fodor's directories of restaurants or hotels) and for all possible types of locations around the world.

Minimal Information

When clicking or pointing (by means of some pointing device) on an icon associated with a particular URL, a minimum of information is displayed:
  a. Title of this URL or NAME of the location;
  b. Abstract or short description of the location [Xi, Yi] associated with this URL;
  c. The UTM or other selected standard or normalized cartographic coordinates of this location [Xi, Yi];
  d. The distance from the location [Xi, Yi] to the reference point [Xr, Yr] (if specified).

Access to HTML Documents

By means of the same pointing device, when clicking or pointing over an icon's [Xi, Yi] position, the complete HTML document associated with the URL is accessed throughout the Web and displayed to the user.

EXAMPLES OF USE

The use of the disclosed system and method is further described by the following examples that are merely illustrative of the possibilities of the invention. The invention can be extended to many other applications (e.g. a geographic "Yellow Pages" service) by anyone skilled in network computing and Internet technologies.

Figure 3:
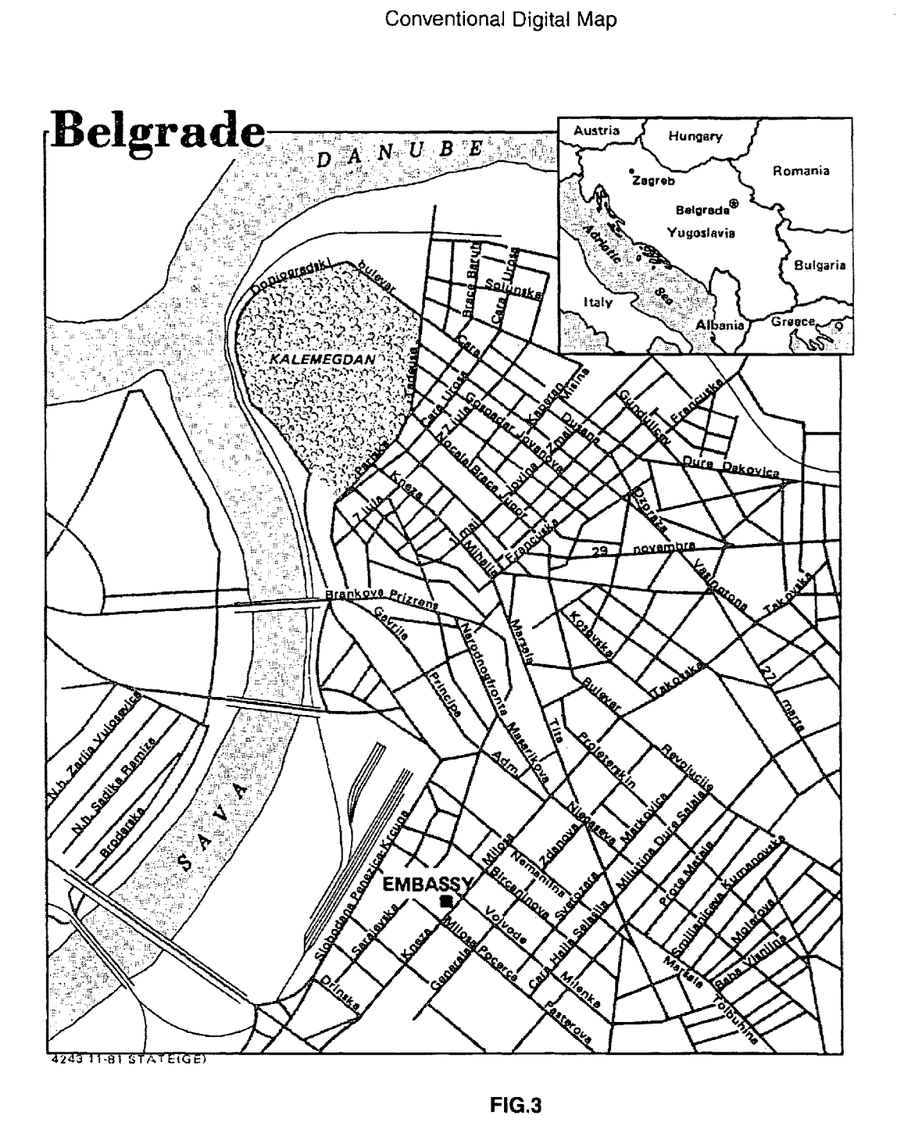
FIG. 3 shows a conventional digital map (Belgrade city, Yugoslavia), as it can be shown on a conventional computer display or public information kiosk operating according to the present invention.

FIG. 3 shows a conventional digital map (Belgrade city), as can be shown on a conventional computer display or public information kiosk and retrieved from a network or permanently stored on a computer by any one of the today available means.

Figure 4:
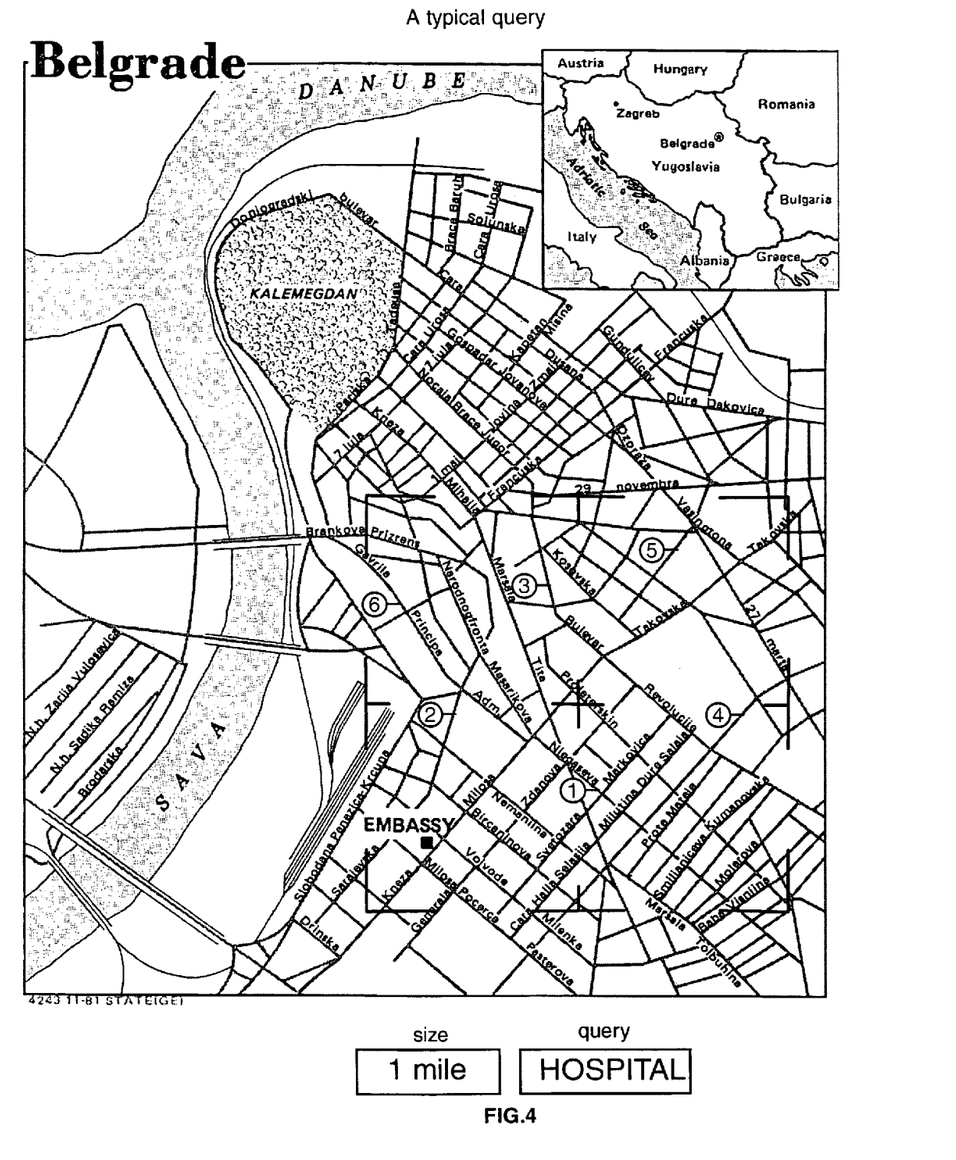
FIG. 4 shows how works the present invention once implemented on a computer system.

FIG. 4 shows how works the invention once implemented in a computer system. A query as been done over a digital map for searching all HOSPITALs on an area of 1×1 mile in Belgrade city around a reference location pointed in the center of the computer screen (in gray). The result of the query is the representation of all Hospitals located inside the search area. Hyperlink icons are in this example small circles with a number inside. The icons are ordered automatically according to the relative distance of each HOSPITAL from the reference point. The user can click on any one of these hyperlink icons to have access to the corresponding HTML document (e.g.: considering HOSPITAL number 2, the URL of this HOSPITAL is accessed on the Web and the information of the HTML document of this HOSPITAL is displayed to the user).

Figure 5:
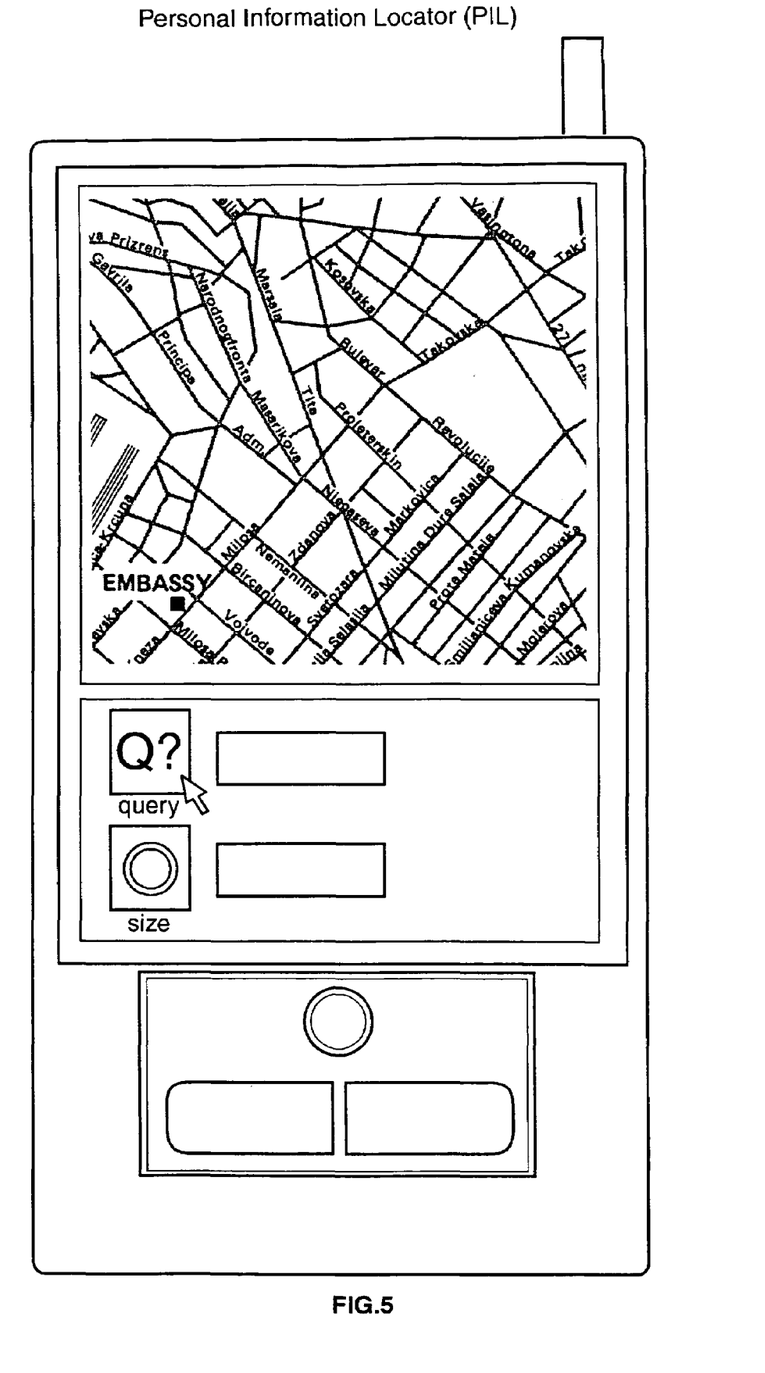
FIG. 5 shows a Personal Information Locator (PIL) according to the present invention.

FIG. 5 shows a Personal Information Locator (PIL) designed according to the present invention. Basically, a PIL comprises:
  a Global Positioning System (GPS) receiver,
  a wireless modem (e.g.: a GSM cell phone), and
  a computer system similar to the one shown in the Figure.

In this example (which illustrates one possible embodiment), the screen of the PIL comprises two areas:
  the upper screen area is reserved to display hyperlink maps,
  the bottom screen area is reserved for entering queries and for displaying the information contained in the HTML documents corresponding to the location selected by means of a pointing device and control keys.

Figure 6:
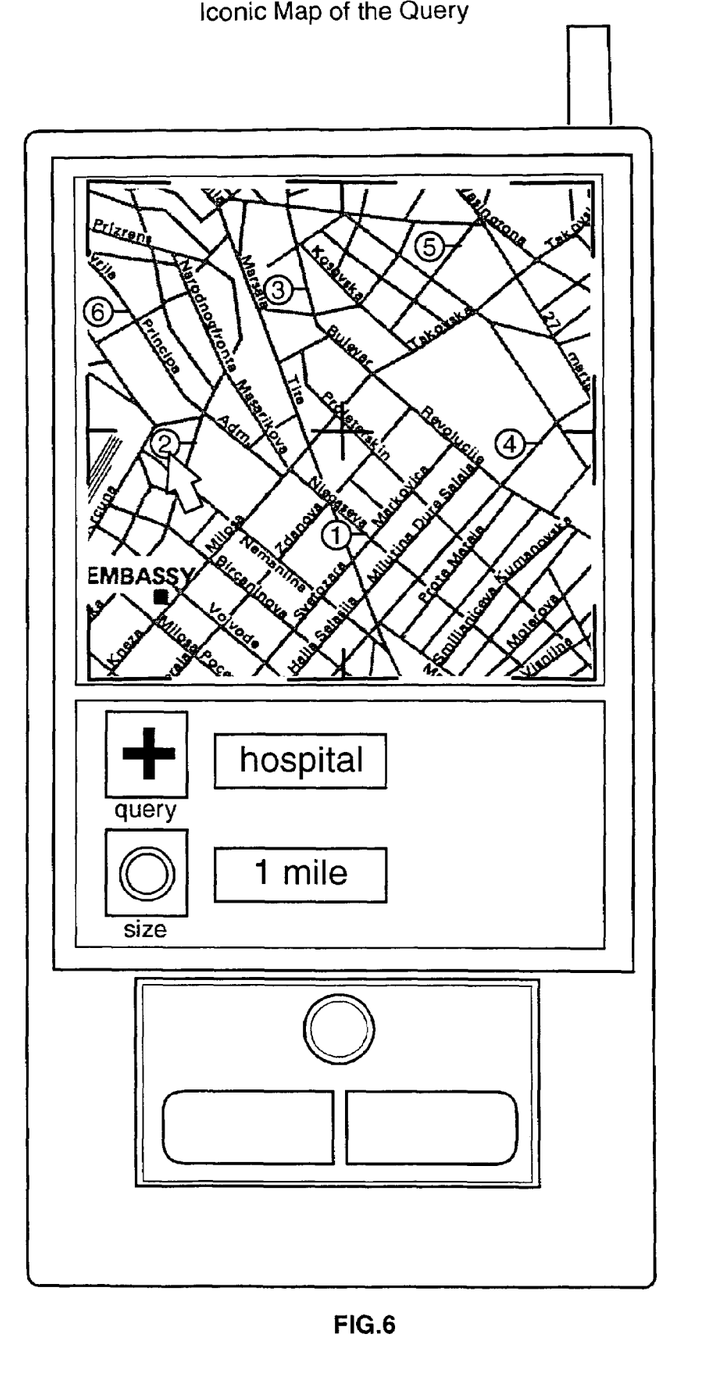
FIG. 6 shows the result of a "geographic fuzzy query" according to the present invention.

FIG. 6 shows the result of a query for locating all HOSPITALs on an area of 1×1 miles around the actual user's position (shown in the screen center). The user's position has been determined by the GPS integrated into the PIL (any kind of positioning device able to determine or receive its own geographic coordinates in the world can be used: GPS, LORAN, GLONASS, radars, radio beacons, pseudolites). The screen shown in FIG. 6 could be the screen of a public information kiosk in Belgrade city and situated in the position shown in the center of the upper (gray) screen. This position corresponds to the (fixed) position of the kiosk previously computed and stored in the kiosk. In this case the background (static) map corresponds to the area of Belgrade assigned to this public information kiosk.

Note: Pseudolites are position/time reference transmitters placed on earth. They play (locally) a function which is equivalent to the function of the constellation of earth orbiting satellites for the GPS or GLONASS positioning systems.

Figure 7:
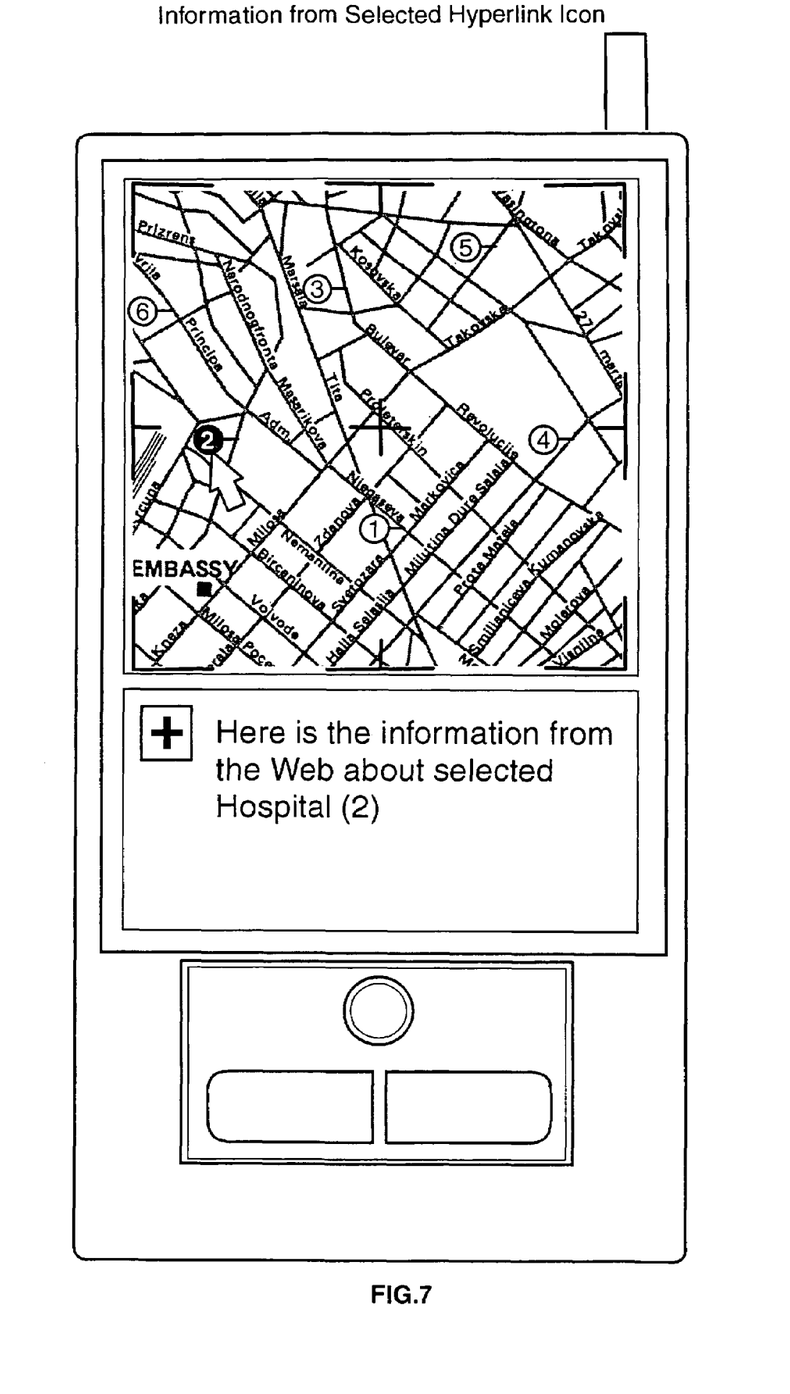
FIG. 7 shows how the information of a selected hyperlink icon is retrieved from the Web according to the present invention.

FIG. 7 shows how the information of a selected hyperlink icon is retrieved from the Web and displayed in the bottom area of the Personal Information Locator (PIL) screen.

While the invention has been particularly shown and described with reference to a preferred embodiment, it will be understood that various changes in form and detail may be made therein without departing from the spirit, and scope of the invention.

What is claimed is:

1. A method in a client system for searching documents in a network comprising one or a plurality of server systems, wherein
  a document can be accessed on the server system from the client system, comprising information related to a geographic location, said document characterized in that it comprises a tag including a tag identifier and a geographic address, said geographic address comprising encoded geographic coordinates of the geographic location described or referenced in the document and said tag identifies the tag as being a geographical tag to enable geographic search capability of the tag,
said method comprising the steps of:
  specifying a reference point;
  determining geographic coordinates of said reference point;
  encoding said geographic coordinates in a geographic address;
  searching on the plurality of server systems for documents tagged with said geographic address;
  specifying a geographic area around the reference point;
  determining geographic coordinates of said geographic area;
  encoding said geographic coordinates in a fuzzy geographic address;
  searching on the plurality of server systems, for documents tagged with a geographic address corresponding to a geographic location within the geographic area;
  wherein said step of encoding geographic coordinates of a geographic area in a fuzzy geographic address comprises the further steps of computing fuzzy geographic coordinates by replacing a wild card character for one or several less significant digits of absolute geographic coordinates $(X_r, Y_r)$ of the reference point depending on a specified geographic area, said wild card character being interpreted as "any trailing string", and including said fuzzy geographic coordinates in said fuzzy geographic address.

2. A method in a client system for searching documents in a network comprising one or a plurality of server systems, wherein
  a document that can be accessed on the server system from the client system comprising information related to a geographic location, said document characterized in that it comprises a tag including a geographic address, said geographic address comprising encoded geographic coordinates of the geographic location described or referenced in the document, wherein said tag also includes one or a plurality of geographic attributes related to the geographic location described or referenced in the document to enable geographic search capability of both the geographic location and the geographic attributes, said method comprising the steps of:
specifying a reference point:
determining geographic coordinates of said reference point:
encoding said geographic coordinates in a geographic address:
searching on the plurality of server systems for documents tagged with said geographic address
specifying a geographic area around the reference point;
determining geographic coordinates of said geographic area;
encoding said geographic coordinates in a fuzzy geographic address;
searching on the plurality of server systems, for documents tagged with a geographic address corresponding to a geographic location within the geographic area;
wherein said step of encoding geographic coordinates of a geographic area in a fuzzy geographic address comprises the further steps of computing fuzzy geographic coordinates by replacing a wild card character for one or several less significant digits of absolute geographic coordinates $(X_r, Y_r)$ of the reference point depending on a specified geographic area, said wild card character being interpreted as "any trailing string", and including said fuzzy geographic coordinates in said fuzzy geographic address.

3. The document according to any one of claims 1 to 2 wherein:
said network is an Internet Protocol network;
said document is a hyper text markup language (HTML) document;
said one or plurality of server systems are Web servers;
said one or plurality of client systems are Web clients.

4. The method according to claim 1 or 2 wherein the geographic coordinates of the geographic location described or referenced in the document are:
bi-dimensional and expressed in terms of longitude and latitude; or,
three dimensional and expressed in terms of longitude, latitude and altitude.

5. The document according to claim 1 or 2 wherein said encoded geographic coordinates of the geographic location include:
absolute geographic coordinates (X, Y) of said location, with X being an absolute longitude X and Y being an absolute latitude Y, wherein:
the absolute longitude X is length of an arc of a terrestrial parallel that goes from a Greenwich meridian to said location in a clockwise direction; and,
the absolute latitude Y is length of another arc of a terrestrial meridian from a North Pole to said location.

6. The method according to claims 1 or 2 comprising the further steps of:
specifying one or a plurality of geographic attributes;
searching on the plurality of server systems, for documents tagged with said one or plurality of geographic attributes.

7. The method according to claims 1 or 2 wherein said step of encoding geographic coordinates of the reference point in a geographic address comprises the further steps of:
computing absolute geographic coordinates $(X_r, Y_r)$ of said reference point, with $X_r$ being an absolute longitude $X_r$, and $Y_r$ being an absolute latitude $Y_r$, wherein:
the absolute longitude $X_r$, is length of an arc of a terrestrial parallel that goes from a Greenwich meridian to said reference point in a clockwise direction; and,
the absolute latitude $Y_r$ is length of another arc of a terrestrial meridian from a North Pole to said reference point;
including said absolute geographic coordinates $(X_r, Y_r)$ in said geographic address (gURL).

8. The method according to claims 1 or 2 wherein said step of specifying a reference point comprises the step of:
selecting the reference point on a digital map by means of any pointing device; or specifying the reference point once for all; or
specifying the reference point once for all; or
measuring an actual position of the client system and using said actual position as the reference point.

9. A computer readable medium comprising instructions adapted for carrying out the method according to claims 1 or 2.

10. A method in a client system for displaying geographic information comprised in documents according to claims 1 or 2, said method comprising, for each document, the steps of:
retrieving absolute geographic coordinates from the geographic address tagged on the documents; and,
mapping the geographic location according to said retrieved absolute geographic coordinates.

11. The method according to claim 10 comprising the further step of:
associating in a table in the client system, network address and the retrieved absolute geographic coordinates of each document.

12. The method according to claim 10, wherein said step of mapping geographic locations comprises the further step of:
defining a scale according to:
the absolute geographic coordinates of documents; and/or
some reference geographic coordinates and scales.

13. The method according to claim 10, wherein the documents are identified responsive to a search query, and wherein the step of mapping a geographic location comprises the step of:
displaying a sensible icon for:
pointing to the retrieved absolute geographic coordinates of the geographic location; and,
pointing to the network address of the document.

14. The method according to claims 1 or 2 comprising the further step of:
mapping the reference point.

15. The method according to claim 11 comprising the further steps of:
pointing to an icon by means of any pointing device; and accessing the document by means of the network address in the table.

16. The method according to claim 10, wherein the documents are identified responsive to a search query, and comprising the further steps of:
pointing to an icon resenting the geographic location by means of any pointing device; and responsive to said pointing, retrieving a minimum information related to the geographic location associated with said icon, said minimum information comprising in particular:
- a title or name of the geographic location;
- a short description of said geographic location;
- geographic coordinates of said geographic location.

17. The method according to claim 13, wherein said step of mapping geographic locations comprises the further step of:
displaying icons on a geographic map with the same scale and reference point that is used to display said sensible icon.

18. The method according to claim 10, wherein said step of mapping geographic locations comprises the further step of:
retrieving a geographic map from one or a plurality of server systems; or
storing a geographic map in the client system.

19. A client system for searching documents in a network comprising a plurality of server systems, wherein
a document can be accessed on the server system from the client system, comprising information related to a geographic location, said document characterized in that it comprises a tag including a tag identifier and a geographic address, said geographic address comprising encoded geographic coordinates of the geographic location described or referenced in the document and said tag identifies the tag as being a geographical tag to enable geographic search capability of the tag,
said system comprising the means for:
specifying a reference point;
determining geographic coordinates of said reference point;
encoding said geographic coordinates in a geographic address;
searching on the plurality of server systems for documents tagged with said geographic address;
specifying a geographic area around the reference point;
determining geographic coordinates of said geographic area;
encoding said geographic coordinates in a fuzzy geographic address;
searching on the plurality of server systems, for documents tagged with a geographic address corresponding to a geographic location within the geographic area;
wherein said means for encoding geographic coordinates of geographic area in a fuzzy geographic address comprises further computing fuzzy geographic coordinates by replacing a wild card character for one or several less significant digits of absolute geographic coordinates $(X_r, Y_r)$ of the reference point depending on a specified geographic area, said wild card character being interpreted as "any trailing string", and including said fuzzy geographic coordinates in said fuzzy geographic address;
retrieving absolute geographic coordinates from the geographic address tagged on the documents; and,
mapping the geographic location according to said retrieved absolute geographic coordinates.

20. A computer readable medium comprising instructions adapted for carrying out the method according to claim 10.

* * * * *

UNITED STATES PATENT AND TRADEMARK OFFICE
CERTIFICATE OF CORRECTION

PATENT NO. : 7,007,228 B1
APPLICATION NO. : 09/523811
DATED : February 28, 2006
INVENTOR(S) : F. I. Carro

It is certified that error appears in the above-identified patent and that said Letters Patent is hereby corrected as shown below:

<u>Column 17</u>
Line 35, replace "document" with --method--
Line 49, replace "document" with --method--

<u>Column 18</u>
Line 66, replace "resenting" with --representing--

Signed and Sealed this

First Day of August, 2006

JON W. DUDAS
*Director of the United States Patent and Trademark Office*